(Model.)
J. SCHAFFER.
ANIMAL TRAP.
No. 314,301. Patented Mar. 24, 1885.
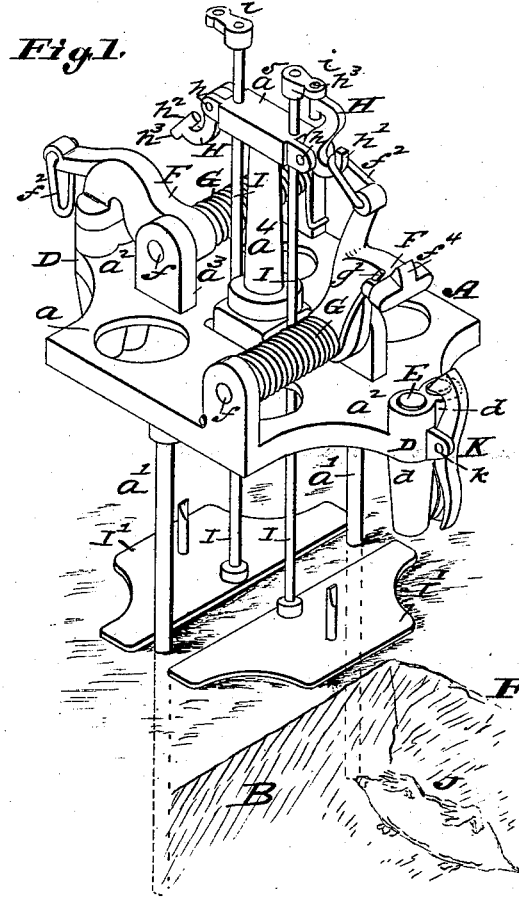
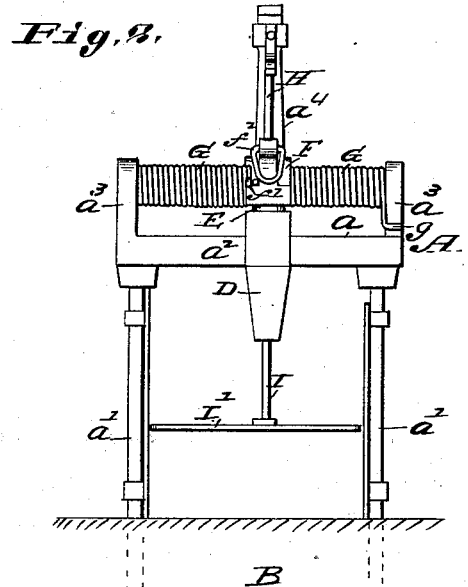
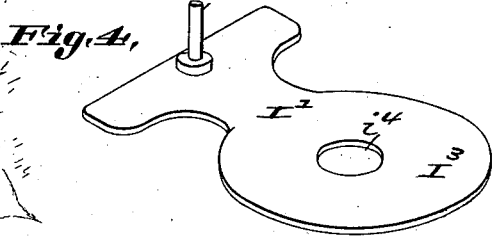
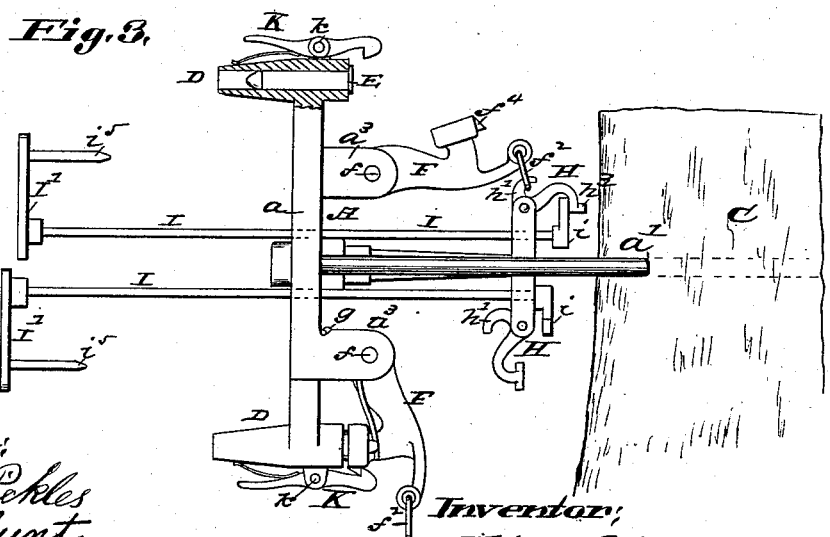
Attest:
Charles Pickles
Cora E. Hunt
Inventor:
John Schaffer
by C D Moody atty

UNITED STATES PATENT OFFICE.

JOHN SCHAFFER, OF KIRKWOOD, MISSOURI.

ANIMAL-TRAP.

SPECIFICATION forming part of Letters Patent No. 314,301, dated March 24, 1885.

Application filed May 19, 1884. (Model.)

*To all whom it may concern:*

Be it known that I, JOHN SCHAFFER, of Kirkwood, Missouri, have made a new and useful Improvement in Animal-Traps, of which the following is a full, clear, and exact description, reference being had to the annexed drawings, making part of this specification, in which—

Figure 1 is a view in perspective of the improvement; Fig. 2, an end elevation; Fig. 3, a side elevation, partly in section, showing the improvement in a different position; and Fig. 4, a view in perspective of one of the trigger-plates extended.

The same letters of reference denote the same parts.

The present device can be applied to various purposes. It is adapted to kill such things as moles and gophers which burrow in the ground. It can also be used for killing animals above ground. The device can also be used as an alarm.

The mechanism in question consists, substantially, of a frame for supporting the working parts, one or more chambers from which cartridges can be fired, the hammers for firing the cartridges, and mechanism by which the animal sought to be killed is caused to operate the hammer-triggers.

A represents the frame. It is composed, mainly, of the plate $a$ and the legs $a'$ $a'$, by means of which the plate can be fixed or held in the desired position. The legs can be made detachable from the plate, and they are suitably constructed for being inserted in the ground B, Figs. 1, 2, or into or around, for instance, a tree, C, Fig. 3, so that the cartridge-chambers can be pointed in the desired direction.

D D represent chambers which are attached to the frame A, or with which the frame A is provided, and which are adapted for firing cartridges E, Figs. 1, 2, 3. One, two, or more cartridge-chambers can be employed. I prefer two, and arranged, respectively, at the ends $a^2$ $a^2$ of the plate $a$, and a further improvement in this respect is making the chambers double-barreled, substantially as shown at $d$ $d$, Fig. 1.

F F represent the hammers by means of which the cartridges are fired. The hammers turn, respectively, upon shafts $f$ or other suitable bearings, which are attached to or supported upon or connected with the plate $a$. In the present instance the shaft $f$ is held in the uprights $a^3$, which stand up from the plate $a$. The hammer is preferably actuated by a spring, G. The spring is conveniently coiled around the shaft $f$. One end, $g$, of the spring is caught around the upright $a^3$, Fig. 3, and the other end, $g'$, of the spring is extended and made to bear upon a projection, $f'$, upon the hammer F. Whenever the hammer is released, the spring acts to throw it sharply down and with sufficient force to fire the cartridge.

The means which I preferably adopt for holding the hammer in position for firing the cartridges is as follows:

$a^4$ represents a standard projecting from the upper side of the plate $a$.

H H represent catches, which at $h$ are pivoted in a horizontal extension, $a^5$, of the standard $a^4$. The catch is provided with the hook $h'$. The hammer is provided with a ring or link, $f^2$, which is adapted to be slipped onto the hook $h'$ of the catch, as shown in Figs. 1, 3. The other end of the catch H is provided with one, $h^2$, and preferably two, $h^2$ $h^3$, projections.

I I represent rods held and adapted to be moved upward and downward through the plate $a$ and standard extension $a^5$, and at their upper ends provided with an eye, $i$. Either projection $h^2$ or $h^3$ of the catch H can be inserted in the eye $i$ of the rod I, as shown in Figs. 1, 3, respectively. At their lower ends the rods are provided with the plates I' I', respectively. These plates are adapted to rest upon the ground and to receive any impulse which may be transmitted from beneath the surface of the ground upward to the plate. To this end the plate may be suitably horizontally extended. They may be made, for instance, as shown in Fig. 1, or as shown at $I^3$, Fig. 4.

I will first describe the operation of the device as when used to catch moles. This animal, (represented at J, Fig. 1,) in his movement through the ground, as is well understood, causes the earth at the surface of the ground to be elevated. The trap, by means of the legs $a'$ $a'$, is set in the ground so as to straddle the mole-track with the cartridge-chambers above ground and pointing directly downward into the mole-track, as in Fig. 1. The person setting the trap flattens the surface of the ground beneath the trigger-plates I' I'. This causes an obstruction in the mole-track, and the mole, in endeavoring to force his way through, causes the ground beneath the trigger-plates to be lifted. The lifting of the plate causes the rod I to be disengaged from the projection $h^3$ of the catch H. This in turn releases the hammer F, whereupon the spring G actuates the hammer and causes the cartridge to be fired. The cartridge-ball passes down into the ground, shooting the mole. In whichever direction the mole approaches he encounters an obstruction, and one or the other of the plates I' I' is lifted and that cartridge is fired which is in the chamber on the side from which the mole approaches. To enable the ball to strike the animal, that portion of the mechanism which is employed to detach the trigger or triggers must not be in line with the cartridge-chambers, and for this reason the animal, especially in case of moles, in agitating the trigger-detaching device does not stand or lie beneath or in line therewith. Consequently, if the cartridge-chamber and trigger-detaching device were in line with each other, the trap would be practically useless, for the ball from the cartridge would in most cases miss the animal.

When it is desired to kill gophers, a trigger-plate such as shown in Fig. 4 is used—that is, the plate is extended at $I^3$, so as to enable the plate to reach over the gopher-hole, and as the gopher endeavors to come out of the hole he encounters the plate and causes the cartridge to be discharged. In this case the ball passes down through the perforation $i^4$ in the plate.

In shooting animals above ground it is oftentimes desirable to actuate the device by drawing the plates I' downward in place of lifting them. To this end the rod I is connected with the lower projection, $h^2$, of the catch H, as shown in Fig. 3. Then, when the rod I and the plate I' are depressed or drawn outward from the plate $a$, the catch is released and the hammer actuated as before. The plate I' in such case may be suitably constructed, as by providing it with the point $i^5$, to be baited. The bait is attached to the point $i^5$, and the animal in drawing upon the bait causes the cartridge to be fired. It is obvious the device can be turned into various positions, so as to direct the balls in any desired direction. Fig. 3 illustrates one such application. In this case the device is arranged horizontally, and the legs $a'$ are used to connect it with an upright object, such as a tree.

The device can also be used simply as a signal. In this case the plates I' may be placed in any object adapted to be moved—for instance, against a door or gate or window-sash—and when the plate is moved the cartridge is fired, and the noise of the firing becomes a very effective signal.

The various uses above enumerated of this device render it peculiarly adaptable for farm purposes, for the device can be used not only for ridding the fields of undesirable objects—such as moles and gophers—and also for killing larger animals, but it can be further used as a signaling apparatus, and thereby be brought into service in protecting any of the buildings about a farm from depredations. The noise created by the firing of the cartridges is also useful in calling attention to the situation when the trap is operated, as thereby animals which are only partially disabled by the action of the trap can be noticed and captured.

In some cases it is desirable to employ a double cartridge-chamber, such as shown at $d$ $d$, Fig. 1. In such a case the hammer is suitably widened, so as to discharge both barrels of the chamber simultaneously. As the recoil is greater when two cartridges are fired, it may be desirable to employ a spring-catch, K, Figs. 1, 3. The catch is pivoted to the frame A at $k$. The bevel $f^4$ upon the hammer causes the catch to be pressed back as the hammer goes down; but after passing it the catch is thrown sharply forward again, so as to hook onto the upper side of the bevel $f^4$, and thereby prevent the hammer from recoiling. Such a catch is useful in connection with a single cartridge-chamber; but I make no claim thereto in the present application, as it is to be made the basis of a separate application.

I claim—

1. The combination, substantially as described, of the frame A, the column $a^4$, the trigger H, having the projections $h^2$ $h^3$, the hammer F, the chamber D, the rod I, the plate I', the spring G, and the link $f^2$.

2. The combination of the plate I', the rod I, having the eye $i$, the frame A, the column $a^4$, having the extension $a^5$, the chamber D, the hammer F, the spring G, and the trigger H, having the projection $h^3$, substantially as described.

3. The combination of the plate I', the rod I, having the eye $i$, the frame A, the column $a^4$, the extension $a^5$, the trigger H, the link $f^2$, the hammer F, the spring G, and the chamber D, substantially as described.

4. In an animal-trap, the combination of the chamber D, the rod I, and the plate I', having the extension $I^3$, as and for the purpose described.

JOHN SCHAFFER.

Witnesses:
CHAS. D. MOODY,
CORA E. HUNT.